(12) United States Patent
Jose et al.

(10) Patent No.: US 7,840,615 B2
(45) Date of Patent: Nov. 23, 2010

(54) SYSTEMS AND METHODS FOR INTEROPERATION OF DIRECTORY SERVICES

(75) Inventors: Sajeeve Jose, Greenacres, FL (US); Roger Urscheler, Boca Raton, FL (US)

(73) Assignee: Siemens Enterprise Communications, Inc., Boca Raton, FL (US)

(*) Notice: Subject to any disclaimer, the term of this patent is extended or adjusted under 35 U.S.C. 154(b) by 509 days.

(21) Appl. No.: 10/912,672

(22) Filed: Aug. 5, 2004

(65) Prior Publication Data

US 2006/0031185 A1 Feb. 9, 2006

(51) Int. Cl.
G06F 7/00 (2006.01)
G06F 17/30 (2006.01)
(52) U.S. Cl. ..................... 707/822; 709/230
(58) Field of Classification Search ............. 707/4, 707/821, 822
See application file for complete search history.

(56) References Cited

U.S. PATENT DOCUMENTS

| | | | | |
|---|---|---|---|---|
| 5,832,274 | A * | 11/1998 | Cutler et al. | 717/171 |
| 5,893,107 | A * | 4/1999 | Chan et al. | 707/103 R |
| 6,061,740 | A * | 5/2000 | Ferguson et al. | 709/246 |
| 6,418,555 | B2 * | 7/2002 | Mohammed | 717/169 |
| 6,470,357 | B1 * | 10/2002 | Garcia et al. | 707/200 |
| 6,484,177 | B1 * | 11/2002 | Van Huben et al. | 707/10 |
| 6,553,368 | B2 * | 4/2003 | Martin et al. | 707/3 |
| 2003/0084104 | A1 * | 5/2003 | Salem et al. | 709/205 |
| 2004/0117386 | A1 * | 6/2004 | Lavender et al. | 707/100 |
| 2004/0187104 | A1 * | 9/2004 | Sardesai et al. | 717/174 |

OTHER PUBLICATIONS http://www.directory-info.com/Recent/ADApplicationMode.html, Microsoft, Introduction to ADAM, Aug. 2002.*
Implementing Active Directory Application Mode, Apr. 1, 2004, http://articles.techrepublic.com.com/5102-6345-5164987.html.*
http://www.directory-info.com/Recent/ADApplicationMode.html, Microsoft, Introduction to ADAM, Aug. 2002.*
Implementing Active Directory Application Mode, Apr. 1, 2004, http:||articles.techrepublic.com.com15102-6345-5164987.html.*
What is Active Directory Application Mode?, updated Mar. 28, 2003, Microsoft Technet, http://technet.microsoft.com/en-us/library/cc738377(WS.10,printer).aspx, pp. 1-9.*
Wikipedia Contributors, "Directory Services Definition", retreived from www.Wikipedia.com.*

* cited by examiner

Primary Examiner—James Trujillo
Assistant Examiner—Jeffrey Burke

(57) ABSTRACT

Systems and methods according to the present invention may include providing a first directory service program, a second directory service program, and a directory service access program for handling client application information requests. The directory service access program may direct and manage the client application information requests to either the first directory service program if the requested information is associated with the first directory service program or the second directory service program if requested information is associated with the second directory service program. The present invention may also include providing a data service synchronizer that replicates certain information from the first directory service program to the second directory service program; monitors the first directory service program for changes; and updates the second directory service program with changes from the first directory service program such that the first and second directory service programs may interoperate with one another.

19 Claims, 3 Drawing Sheets

SYSTEMS AND METHODS FOR INTEROPERATION OF DIRECTORY SERVICES

BACKGROUND OF THE INVENTION

The present invention relates to the management of computers and computer networks and, more particularly, to systems and methods that provide and facilitate the interoperation of directory services associated with a computer management system.

Modern computer-based structured storage systems such as computer file systems and database systems provide users with quick and easy access to enormous amounts of data. Structured storage systems allow businesses to generate and maintain stores of data that may be modified and updated over time. For many companies, data is a valuable capital asset that is employed each day to perform the company's core operations. The data can be, for example, computer files (e.g., source code, word processing documents, etc.), database records, and other information such as information regarding employees, customers, and/or products.

A typical computer-based structured storage system includes a central server that provides centralized control over the structured store of data. The structured store of data is the information that is maintained by the system such as information in the directories of a file system or within the records of a database system. The central server provides system services to a number of interconnected network client nodes, each of which employs the central server to access and manipulate the structured data store.

Currently, it is common for the central network server to provide a directory service (i.e., a specialized hierarchical database of network, user, and other computer system configuration information). This information typically includes operating system configuration information, application program configuration information, network configuration information, network-accessible resources, exported devices and services, network printers, user account records, etc. Network user accounts allow network-wide, unified "log on", system access and allow sophisticated application programs to obtain broader, coherent name spaces (e.g., electronic mail system application programs). Novell's Directory Server (NDS), is one example of software that implements a directory service and that runs on a central server to allow maintenance of and access to directory information.

Although central server directory services such as NDS generally provide the desired network management functions, problems arise from relying on centralized control. For example, the operation of the network is dependent upon the proper functioning of the central server. Any failure of the server to maintain proper operation, such as a power failure, hardware failure, or other such system failure, may disable the entire network and may generally prevent users from obtaining access to the network and its resources. Additionally, a large number of client requests for information (e.g., access of user account records) over a short period of time can overload the central server and slow down or crash the network. Accordingly, reliance on a centralized, server-based directory service can result in slow operation or total network failure during periods of heavy use.

Recently, technology has been developed to improve the reliability and operation of a centralized server directory service. This technology involves employing multiple central servers. Each of the servers provides a directory service. Whenever the directory information changes, all of the redundant servers are updated so that requests can be made to any of the centralized servers without impacting the correctness of the response.

Examples of this centralized, statically replicated, hierarchical directory service technology include Microsoft's Active Directory, NDS, Banyan's Streetalk, and X.500 directory services. Lightweight Directory Access Protocol (LDAP) is a "common" protocol that can be used to access data from any compatible directory server such as Active Directory.

Active Directory is an important part of the Microsoft Windows network architecture that provides a directory service designed for distributed networking environments. Active Directory allows organizations to store information in a hierarchical, object-oriented fashion, and provides multi-master replication to support multiple-server distributed network environments. Active Directory acts as an integration point for bringing systems together and consolidating management tasks. Active Directory also provides a single point of management for Windows-based user accounts, clients, servers, and applications.

Although Active Directory offers many benefits for managing network infrastructure, organizations often need a more flexible directory service to support directory-enabled applications. For example, many directory-enabled applications require the directory service to be extended with application-specific schema extensions. Such schema extensions are supported in Active Directory. However, because Active Directory is often considered to be critical for overall network operations, many network administrators will not allow application-specific schema changes within Active Directory that may cause system instability. In addition, many LDAP directory usage scenarios, including development, portal, and legacy application usage scenarios, are hindered by the specific domain requirements of Active Directory.

More recently, Microsoft has introduced the Active Directory Application Mode (ADAM), which is a new mode of Active Directory that is designed specifically for directory-enabled applications. Although Active Directory (AD) offers many benefits for managing network infrastructure, organizations often need a more flexible directory service for support of directory-enabled applications. ADAM is a directory service that is designed to meet the needs of customers that cannot rely solely on Active Directory for providing directory services for directory-enabled applications. Application programs may have to support both ADAM and AD directory services in order to meet the goals and expectations of network administrators and end users.

Accordingly, what is needed is a network management system in which directory services may interoperate with one another.

In view of the foregoing, it would be desirable to provide systems and methods that allow directory services in a network management system to interoperate with one another.

It would also be desirable to provide systems and methods that allow directory services to handle application-specific schema extensions without the risk of system instability.

It would be further desirable to provide systems and methods that allow Active Directory and Active Directory Application Mode directory services in a network management system to communicate and interoperate with one another.

SUMMARY OF THE INVENTION

It is an object of the present invention to provide systems and methods that allow directory services in a network management system to interoperate with one another.

It is another object of the present invention to provide systems and methods that allow directory services to handle application-specific schema extensions without the risk of system instability.

It is a further object of the present invention to provide systems and methods that allow Active Directory and Active Directory Application Mode in a network management system to communicate and interoperate with one another.

These and other objects of the invention are provided in accordance with the principles of the present invention by providing systems and methods that allow directory services in a network management system to interoperate with one another.

Systems and methods according to the present invention may include providing a first directory service program, a second directory service program, and a directory service access program for handling client application information requests. The directory service access program may direct and manage the client application information requests to either the first directory service program if the requested information is associated with the first directory service program or the second directory service program if the requested information is associated with the second directory service program.

The systems and methods of the present invention may also include providing a data service synchronizer that replicates certain information from the first directory service program to the second directory service program. The data service synchronizer may also monitor the first directory service program for changes in the first directory service program and periodically update the second directory service program with changes from the first directory service program such that the first and second directory service programs may interoperate with one another.

BRIEF DESCRIPTION OF THE DRAWINGS

The above and other objects and advantages of the present invention will be apparent upon consideration of the following detailed description, taken in conjunction with the accompanying drawings, in which like reference numbers refer to like parts throughout, and in which.

DETAILED DESCRIPTION OF THE INVENTION

Figure 1:
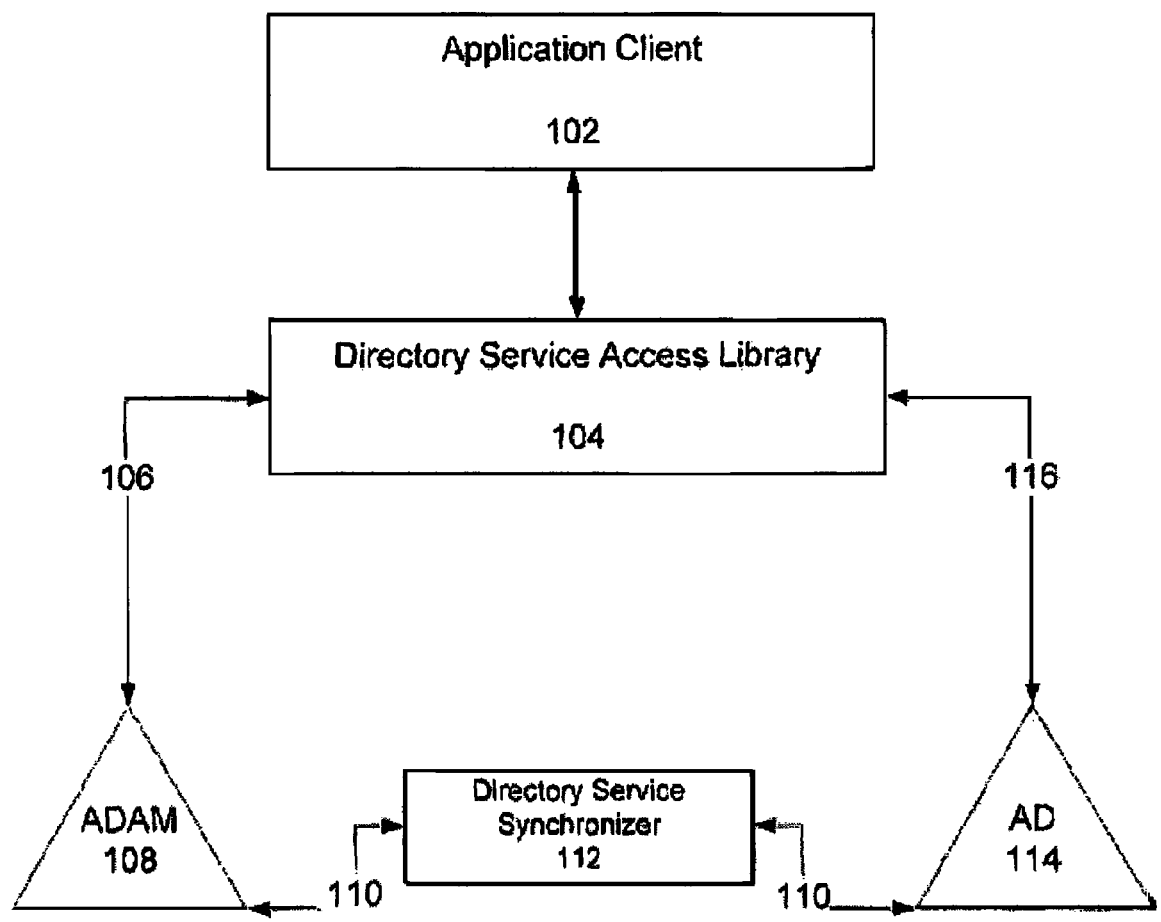
FIG. 1 shows a generalized logical block diagram of a system constructed in accordance with the principles of a preferred embodiment of the present invention for providing systems and methods that allow directory services in a network management system to interoperate with one another.

FIG. 1 shows a generalized block diagram of a system 100 for allowing directory services in a network management system to interoperate with one another. The system may include directory service access library 104, communications links 106, 110 and 116, Active Directory Application Mode instance 108 (ADAM), directory service synchronizer 112 and Active Directory 114 (AD).

In operation, application client 102, which may be any suitable application program seeking directory services such as a Domain Name Service (DNS), may send a request for directory services or directory information to directory service access library 104. Library 104 acts (at least in part) as an arbiter of such requests, and generally speaking, routes such requests to the appropriate directory, either ADAM 108 or AD 114 (or a combination of the two as explained in more detail below). These requests are then conveyed via either communication link 106 or 116 to the appropriate directory instance 108 and/or 114 for processing. Responses to such requests are then routed back to client application 102 through library 104.

AD 114 and ADAM 108 are preferably functions of the Active Directory and Active Directory Application Mode directory management services provided by Microsoft Corporation of Redmond, Wash., but any other directory management software having the same or similar functionality may be used if desired. In operation, ADAM 108 may be installed on a network computer managed by AD 114. Each ADAM 108 preferably creates and maintains a service connection point object about itself and the information it contains in AD 114 (not shown). This allows AD 114 to be cognizant of the information contained in ADAM 108 and allows AD 114 to index an obtain such information such that ADAM 108 and AD 114 may successfully interoperate with one another.

In a typical system in which AD 114 is preexisting on a subject network, and ADAM 108 installed afterwards, data for a particular client application 102 is distributed between AD 114 and ADAM 108 as required for proper operation. Data that already exists in AD 114 preferably remains there, however, some of the data necessary for client application 102 to operate may be replicated to ADAM 108. The decision to replicate data to ADAM 108 may be made, at least in part, based on the function that data is intended to be used for. For example, basic directory management data may be replicated to ADAM 108. Certain other types of data however, such as those requiring schema extension, may be stored only in ADAM 108 (at least temporarily).

In some embodiments, client application 102 may be supplied with library similar to library 104, to provide each application 102 with an independent view of the underlying directory service technology being employed (e.g., AD, ADAM or a combination of both). In other embodiments, library 104 may be associated with the directory service and may act as a front end access point to directory services such that each application 102 requests access to directory services through library 104.

In either implementation, when directory services are requested, the library (e.g., library 104) may issue a query for a specific configured ADAM in AD 114 (depending on the information requested). If an ADAM entry is found in AD 114, library 104 may direct information requests to ADAM 108 (via link 106) and then to AD 114 (via link 116), if the information requested was available in ADAM 108. If an ADAM entry is not found in AD 114, then directory information requests will be sent directly to AD 114 (i.e., without consulting ADAM 108).

In some embodiments, system 100 may include directory service synchronizer 112 which may provide communications between and synchronize data in AD 114 and ADAM 108 (via link 110). Synchronizer 112 may periodically poll or otherwise consult with AD 114 and ADAM 108 to confirm that the appropriate data, instance entry, or other cross-referencing or indexing information is present in both directory service instances. If the appropriate data is not in both directories, synchronizer may copy certain information from AD 114 to ADAM 108 (or potentially vice versa) to maintain the appropriate data storage in each instance. Such periodic polling of AD 114 and ADAM 108 may be initiated by external management software (not shown) or by ADAM 108, AD 114, synchronizer 112 or any combination of these or other components, if desired.

Generally speaking, modifications made to client application data originally present in AD 114 will preferably be made in AD 114. Such information may then be synchronized to ADAM 108 by way of synchronizer 112. If, however, the data to be modified is not found in AD 114, it may be modified in ADAM 108, and subsequently may or may not be updated in AD 114, depending on the information type.

In the case where operation in the ADAM mode needs to be discontinued, the enterprise schema in AD 114 may be extended, and some or all of the data in ADAM 108 may be migrated to AD 114 (again, depending on information type). At this point, ADAM 108 may be prohibited from publishing its instance entry to AD 114 and the instance entry of ADAM 108 present in AD 114 may be removed such that library 104 will not find any instance of ADAM 108 in AD 114. This leaves system 100 operating in AD only mode with the schema extensions absorbed from ADAM 108.

Thus, the above-described system discloses a way in which directory services may effectively interoperate with each other to provide improved and enhanced network management functions. More specifically, system 100 allows network administrators and other users to gain the benefits associated with ADAM instances including the use of schema extensions, without sacrificing system stability associated with such schema extensions performed directly in AD 114.

Figure 2:
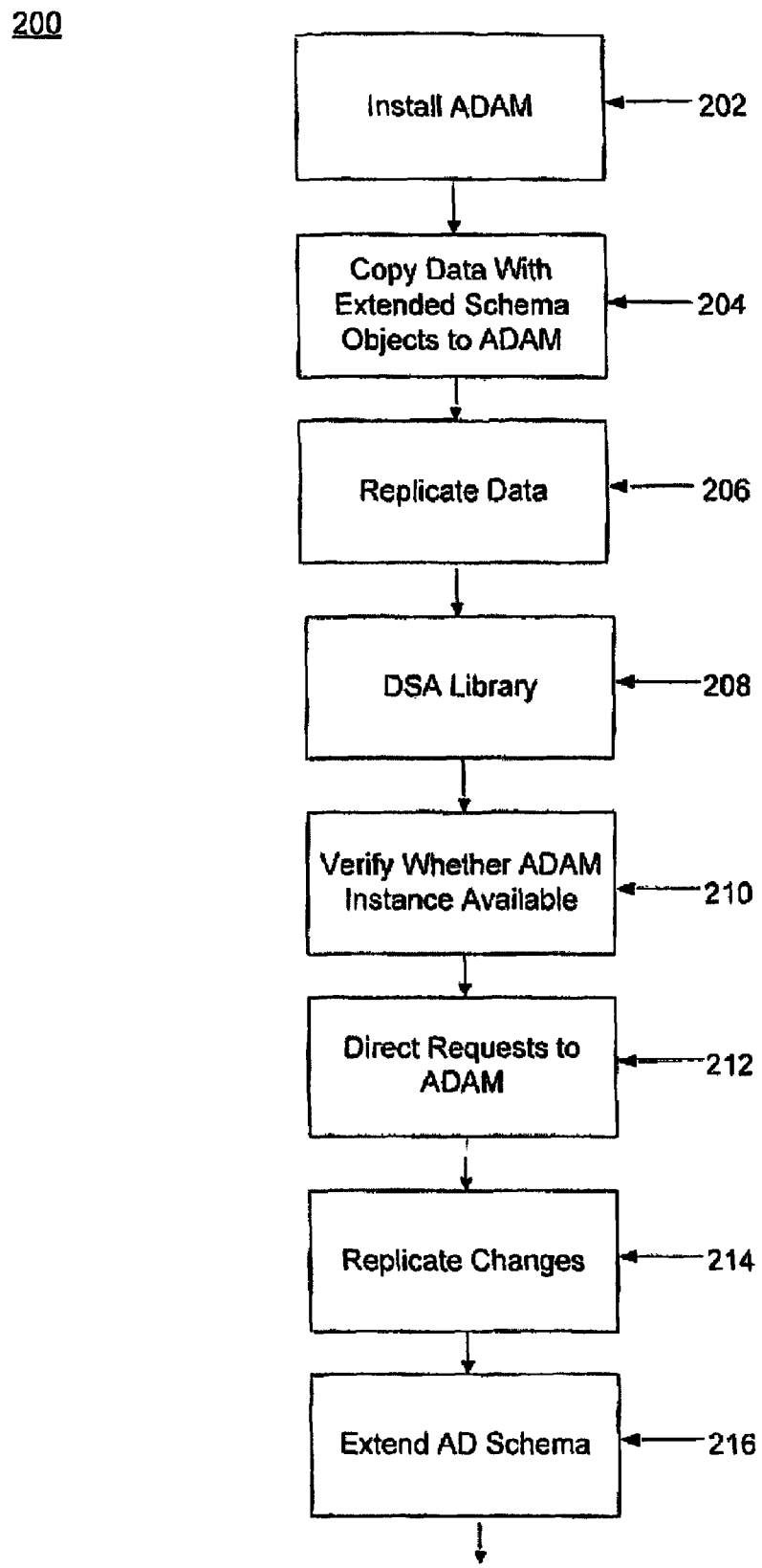
FIG. 2 is a flow chart illustrating some of the steps involved in a preferred embodiment of the invention for allowing directory services in a network management system to interoperate with one another.
Figure 3:
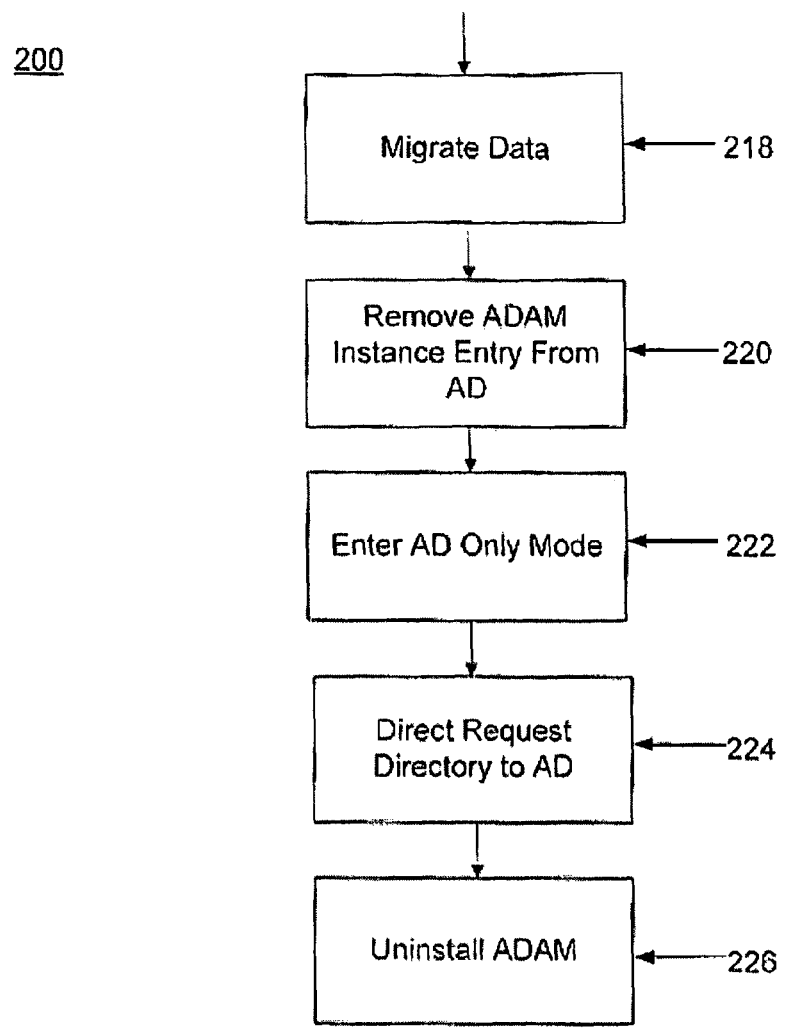
FIG. 3 is a continuation of the flow chart of FIG. 2.

Some of the steps involved in the interoperation of directory services and schema extension are illustrated in flow chart 200, shown in FIGS. 2 and 3, and are described below.

At step 202, ADAM 108 may be installed with a specific instance identification at system setup or initialization. This ADAM 108 may be appropriately configured and its schema will be extended with the extension that may be required for a specific client application 102 (or multiple applications as required).

At step 204, AD 114 may continue to be used for the storage of the existing directory data. Data pertaining to schema objects that are to be extended may be moved from AD 114 to ADAM 108 during the initial system setup.

At step 206, synchronizer 112 may maintain the integrity of the data between AD 114 and ADAM 108 by replicating the necessary data from AD 114 to ADAM 108. Once the ADAM 108 is initialized with the required data, synchronizer 112 will then preferably maintain the consistency and integrity of data contents in these two directory services by periodically comparing and copying the necessary data from AD 114 to ADAM 108. At this point, directory services are configured to interoperate with one another.

Next, at step 208, an application program such as application client 102 may request directory information by consulting with library 104 to access the directory services.

At step 210, library 104 may process this request by verifying whether ADAM 108 is available (in AD 114). This may be accomplished by checking whether an ADAM is published in AD 114 and then connecting to the published ADAM and verifying whether the application service is published in a specific application partition of the ADAM. If such an instance is found and the published service is found, library 104 is running in ADAM mode.

When in ADAM mode, DSA library will direct the requests to ADAM 108. Otherwise requests will be directed to AD 114 (step 212).

Next, at step 214, synchronizer 112 monitors any changes made in AD 114 for possible replication in ADAM 108. When in ADAM mode, these changes are preferably made to ADAM objects as AD data changes are made.

At step 216, if a user agrees to accept the schema changes from ADAM 108 and is ready to use an AD only mode of operation, the AD (enterprise) schema is extended.

After the enterprise schema is extended, selected data will be migrated from the ADAM 108 to AD 114 (step 218). In some embodiments, directory-enabled applications are unaware of this migration and ADAM 108 will be still active through out the migration. In other embodiments, applications may be aware of this change and will request and receive directory information from AD 114, bypassing any references to ADAM 108.

Once the data migration of step 218 is performed, the ADAM entry in AD 114 is preferably removed. Also, at substantially the same time, the publishing mode for the ADAM instance 108 is disabled (step 220). This prevents library 104 from detecting an ADAM instance.

Next, at step 222, if the ADAM entry is not found in AD 114 or if the application service is not published in the specified application partition of the ADAM instance, library 104 enters into an "AD only" mode.

In AD-only mode, library 104 directs all requests for directory information to AD 114 directly (step 224). At this point, the enterprise data schema should be extended with the required schema extension from ADAM 108, otherwise the requests for data with these schema extensions will fail.

Lastly, at step 226, ADAM instance can be uninstalled after it has been verified that the enterprise schema has been properly extended.

It will be appreciated that the steps described above are not intended to be comprehensive or necessarily performed in the order shown.

Thus, it is shown from the above that systems and methods for the interoperation of directory services are provided. Moreover, it will be understood that the foregoing is only illustrative of the principles of the invention and that various modifications can be made by those skilled in the art without departing from the scope and spirit of the invention. For example, although communications links 106, 110 and 116 are depicted as discrete links between different processes it will be understood that these links are intended to represent any suitable communications path between logical processes operating on a computer system and are not necessarily separate or discrete from one another. Accordingly, such embodiments will be recognized as within the scope of the present invention.

Persons skilled in the art will appreciate that the present invention can be practiced by other than the described embodiments, which are presented for purposes of illustration rather than of limitation and that the present invention is limited only by the claims that follow.

What is claimed is:

1. A method to provide interoperation of directory services resident on a computer system comprising:
    on a computer system with a first directory service resident and managing a network, installing a second directory service resident on a network computer system, selected application-specific schema changes being prohibited in said first directory service and allowed in said second directory service;
    starting a directory service access library to handle client application information requests from directory-enabled applications and managing access as a front end access point to the first and the second directory services, the directory service access library directing the client application information requests to the first directory service and selectively redirecting the client application information requests to the second directory service when requested information is associated with the second directory service, such that the first and the second directory services interoperate with one another on the network;

selectively migrating data from said second directory service to said first directory service, wherein selectively migrating data comprises removing installed instance entries in the first directory service indicating the presence of the second service and extending said schema extensions to the first directory service; and selectively disabling said second directory service, said directory service access library being prevented from detecting said disabled second directory service, wherein disabling said second directory service comprises disabling publishing mode for the second directory service.

2. The method of claim 1, further comprising:

installing an instance entry in the first directory service indicating the presence of the second service and when said instance entry is found, said directory service access library redirects the client application information requests; and extending said application-specific schema changes as schema extensions to the second directory service, wherein data pertaining to schema objects may be moved from the first directory service to the second directory service.

3. The method of claim 1, further comprising installing the second directory service with a specific instance identification.

4. The method of claim 1, further comprising monitoring and comparing the information in the first and the second directory services and selectively copying information from the first directory service to the second directory service.

5. The method of claim 1, further comprising at least periodically copying information from the first directory service to the second directory service based upon the monitoring of the data in the first and the second directory services.

6. The method of claim 1, further comprising copying the extended application-specific schema objects from the second directory service to the first directory service.

7. The method of claim 1, further comprising uninstalling the disabled second directory service after copying the extended application-specific schema objects from the second directory service to the first directory service when data is selectively migrated.

8. The method of claim 7, wherein the first directory service is an Active Directory (AD) directory service and the second directory service is an Active Directory Application Mode directory service installed at system initialization.

9. A method to provide interoperation of directory services resident on a computer system comprising:

on a computer system with a first directory service resident and managing a network, installing a second directory service resident on the computer system, selected application-specific schema changes being prohibited in said first directory service and allowed in said second directory service;

starting a directory service access library, said directory service access library being a front end access point from directory-enabled applications to the first directory service and the second directory service, directory-enabled application requests accessing the first directory service and selectively redirected to access the second directory service through the directory service access library;

starting a data service synchronizer that replicates certain information from the first directory service to the second directory service and that monitors the first directory service for changes in the first directory service and periodically updates the second directory service with changes from the first directory service such that the first and the second directory services-may interoperate with one another; and selectively migrating data from said second directory service to said first directory service and disabling publishing mode for said second directory service, wherein selectively migrating data comprises removing installed instance entries in the first directory service indicating the presence of the second service and extending said schema extensions to the first directory service, said directory service access library directing all subsequent requests to said first directory service.

10. The method of claim 9, wherein the first directory service is an Active Directory (AD) directory service and the second directory service is configured to extend said application-specific schema changes as AD schema extensions to objects associated with an application accessing the secondary directory service.

11. The method of claim 10, wherein the second directory service is an Active Directory Application Mode directory service installed at start-up.

12. The method of claim 9, wherein the directory service access library is an arbiter handling client application information requests from said directory-enabled applications, the directory service access arbiter directing the client application information requests to the first directory service and redirecting the client application information requests to the second directory service when requested information is associated with the second directory service.

13. A computer program product for maintaining interoperating resident directory services, said computer program product comprising a computer usable medium having computer readable program code stored thereon, said stored computer readable program code comprising:

computer readable program code means for providing a first directory service on a computer, application-specific schema changes being selectively prohibited in said first directory service, the computer with the first directory services managing a network;

computer readable program code means for providing said computer with a second directory service different than said first directory service and allowing said selectively prohibited application-specific schema changes;

computer readable program code means for directory service access arbitration handling client application information requests from directory-enabled applications, directing client application information requests to the first directory service and for selectively redirecting the client application information requests to the second directory service when requested information is associated with the second directory service, such that the first and the second directory services-interoperate with one another on the network; and computer readable program code means for selectively migrating data from said second directory service to said first directory service and disabling publishing mode for said second directory service, wherein selectively migrating data comprises removing installed instance entries in the first directory service indicating the presence of the second service and extending said schema extensions to the first directory service, said directory service access library directing all subsequent requests to said first directory service.

14. A computer program product as in claim 13, wherein said computer readable program code means for said first directory service comprises computer readable program code means for providing an Active Directory (AD) service and said computer readable program code means for providing the second directory service comprises computer readable program code means for extending application-specific schema changes as AD schema extensions to objects associated with an application accessing the secondary directory service.

15. A computer program product as in claim 14, wherein said computer readable program code means for said second directory service comprises computer readable program code means for providing an Active Directory Application Mode directory service installed at start-up.

16. A computer program product as in claim 13, further comprising computer readable program code means for synchronizing directory services providing communications and, synchronizing data, between the first directory service and the second directory service.

17. A computer program product as in claim 16, wherein the computer readable program code means for synchronizing further comprises computer readable program code means for periodically consulting with the first directory service and the second directory service to confirm that appropriate information is present in the first and the second directory service.

18. A computer program product as in claim 16, wherein the computer readable program code means for synchronizing replicates and transfers information from the first directory service to the second directory service to maintain appropriate data storage.

19. A computer program product as in claim 13, wherein computer readable program code means for said secondary directory service transfers said objects from the second directory service to the first directory service.

* * * * *